United States Patent Office 3,486,967
Patented Dec. 30, 1969

3,486,967
HEAT-SEALABLE POLYURETHANE FOAM CONTAINING OIL FURNACE CARBON BLACK AND LAMINATES
Leo Fisher, New Haven, Conn., assignor to The B. F. Goodrich Company, New York, N.Y., a corporation of New York
No Drawing. Filed Dec. 29, 1966, Ser. No. 607,596
Int. Cl. B32b 5/18, 27/40, 7/02
U.S. Cl. 161—160                    10 Claims

ABSTRACT OF THE DISCLOSURE

The presence of oil furnace carbon blacks in flexible polyurethane foams results in exceptional heat-sealing properties which permits the polyurethane foam to be tenaciously laminated with a thermoplastic film by heat-lamination. The lamination of a layer of the heat-sealable polyurethane foam with the layer of thermoplastic film by a heat-sealing technique enables decorative embossed panels suitable for automobile door panels and other uses to be economically produced.

---

The present invention pertains to polyurethane foams which exhibit exceptional heat-sealability which allows them to be conveniently combined with vinyl chloride polymer sheeting by heat-sealing techniques to produce useful laminates.

In recent years, the use of embossed panels having a flexible exterior surface of a thermoplastic material backed with a layer of a resilient foam have been used extensively for interior trim in automobiles. The panels not only are attractive but serve the purpose of protecting a person against injury if the person accidentally strikes the panel. The panels may be flexible and be used for automobile head-liners and automobile dashboard covers or may have a backing of cardboard or similar reinforcement to provide a degree of rigidity to the panel so as to adapt the structure for use as a door panel. Originally, such panels were constructed of an exterior surface layer of flexible polyvinyl chloride which was united with a layer of resilient polyvinyl chloride foam. Since both layers were formed of the same thermoplastic material, they could conveniently be combined and simultaneously embossed by heat-sealing methods. However, vinyl chloride polymer foams are relatively expensive and do not possess certain other advantageous characteristics that are exhibited by certain other flexible foam materials such as polyurethane foams. Consequently, the desire to form such panels of a layer of a thermoplastic material combined with a layer of polyurethane foam persisted. Unfortunately, the combining of polyurethane foams with a layer of a thermoplastic material such as polyvinyl chloride cannot be conveniently accomplished by heat-sealing methods since polyurethane foams fuse at temperatures above about 400° F. whereas most vinyl chloride polymers soften at a temperature of about 150° F. and degrade rapidly at a temperature of about 350° F. Consequently, in order to heat-seal the polyurethane foam to a layer of vinyl chloride polymer, the vinyl chloride polymer at the same time must be heated to a temperature above that at which it rapidly degrades.

Various procedures have been proposed for overcoming this difficulty. In U.S. Patent No. 3,061,460, it is suggested that the polyurethane foam be impregnated with a thermoplastic material such as polyvinyl chloride to impart properties to the foam that will enable it to be heat-sealed at a lower temperature. In U.S. Patent No. 3,244,571, it is suggested that the heat-sealability of polyurethane foams can be improved by the presence of impurities in the foam to alter the dielectric characteristics of the foam. The impurities suggested are graphite, carbon, iron oxide and polyvinyl chloride particles.

The present invention resides in the discovery that a particular class of carbon blacks impart exceptional heat-sealing properties to polyurethane foams. Although this class of carbon blacks improves the heat-sealable properties of polyester urethane foams, the present invention is more germane to polyether urethane foams since polyester urethane foams are more easily combined by heat-sealing techniques with a vinyl chloride polymer film than are polyether urethane foams and heretofore proposed methods for rendering polyester urethane foams heat-sealable adequately improve the heat-sealable properties of the polyester urethane foams for most applications. Such heretofore proposed methods for rendering polyester urethane foams heat-sealable do not adequately improve the heat-sealability properties of polyether urethane foams which has limited the applications for such foams.

In accordance with the present invention, an unpelletized furnace carbon black derived by burning petroleum oil and having the following characteristics is added to the liquid urethane mix from which the polyurethane foam is formed:

CHARACTERISTICS

| | |
|---|---|
| Volume resistivity (measured in accordance with A.S.T.M. Designation D991–48T; 50 parts of carbon black per hundred parts of rubber in natural rubber compound [1]) | 10–30 ohm.-cm. |
| Average particle diameter | 26–35 millimicrons. |
| Volatile content (measured in accordance with A.S.T.M. Designation D1620–58T) | 1.70–2.5%. |
| Bulk density (unpelletized) | 5–7 lbs./cu. ft. |
| Surface area | 170–220 m.$^2$/gm. |
| Oil absorption | 2.4–3.0 cc. oil/gm. of black. |
| Iodine number (measured in accordance with A.S.T.M. Designation D1510–57T) | 230–270. |

[1] Natural rubber compound is as follows:

| Material: | Parts by weight |
|---|---|
| Natural rubber | 100.0 |
| Carbon black | 50.0 |
| Zinc oxide | 5.0 |
| Stearic acid | 3.0 |
| Pine tar | 3.0 |
| Antioxidant (Agerite Hipar) | 1.0 |
| Sulfur | 2.5 |

Cure: 60 minutes at 280° F.

The resulting polyurethane foam has exceptional heat-sealability and when combined with a layer of vinyl chloride polymer by heat-sealing methods produces an unusually tenacious bond with the vinyl chloride polymer layer.

As indicated above, the exceptional increase in heat-sealability is observed when a furnace black derived from oil and having the said characteristics is present either in polyester urethane foams or polyether urethane foams. Heat-seal bond strengths between the vinyl chloride polymer layer and polyether urethane foam approaching 6 pounds per inch have been realized as a result of the presence of said carbon blacks in relatively small quantities (2.0 parts by weight of carbon black per 100 parts by weight of polyether resin) in the polyurethane foam whereas a variety of other carbon blacks evaluated under the same conditions exhibited heat-seal bond strengths no higher than 3.2 pounds per inch. It was found that optimum bond strengths between the polyurethane foams and the layer of vinyl chloride polymer were developed when as little as from 0.5 to 3.0 parts by weight of the carbon black per 100 parts by weight of the polyether or polyester resin is employed, although up to about 4.5 parts by weight of the carbon black per 100 parts by weight of the polyol may be used, if desired. The urethane mix becomes objectionably viscous if more than about 4.5 parts of the carbon black is used per 100 parts of the polyol. The vast improvement in heat-seal bond strength realized by the addition of a relatively small amount of the carbon black is particularly fortunate since the presence of substantial amounts of filler in polyurethane foams normally results in an impairment of desirable physical properties of the foam. The carbon blacks to which this invention is directed desirably are dispersed into the liquid urethane mix merely by stirring (using propeller agitation, if desired), rather than by ball-milling, since it was observed that the bond strength of the polyurethane foam decreased from an optimum value when the carbon black was dispersed in the mix by ball-milling (as compared to merely stirring the carbon black into the urethane mix), probably because ball-milling tends to cause the carbon black to agglomerate.

Flexible polyurethanes result from the reaction between polyols and isocyanates. The polyols customarily used in the manufacture of polyurethane are polyethers (generally based on condensates of polyhydric alcohols such as propylene glycol and glycerin with an alkylene oxide, such as ethylene oxide or propylene oxide) and hydroxyl terminated polyesters. The isocyanate most commonly used in the manufacturing of flexible polyurethane foams is toluene diisocyanate, although other isocyanates may be used in place of or with the toluene diisocyanate. The cellular structure generally is developed by carbon dioxide liberated by the reaction of water (added to the mix) with isocyanate in the mix and/or through the use of a volatile blowing agent (such as methylene chloride) which is added to the mix and which vaporizes as a result of the exothermic heat generated within the mix by the reaction of polyol with isocyanate. Additional discussion on the manufacture of flexible polyurethane foams is found in U.S. Patents Nos. 2,764,565 and 3,072,582, although this technology is well-known in the industry. Generally, flexible polyurethane foam layers having a density of from 1.2 to 3.0 pounds per cubic foot and having a thickness of from ⅛ to 1.0 inch are used for combining with a layer of thermoplastic material in the formation of the mentioned panels. The thickness of the layer of thermoplastic material generally does not exceed a thickness of about ⅛ inch in such laminates.

The flexible thermoplastic layer with which the polyurethane foam is combined by heat-sealing desirably is a vinyl chloride polymer such as polyvinyl chloride or copolymers of vinyl chloride with copolymerizable monomers. While the layer of thermoplastic material may be a non-porous sheet of the thermoplastic material (with or without a fabric backing), desirably the layer of thermoplastic material is a cellular material having a fine cellular structure (i.e., a structure having cells of small size), since the feel or "hand" of the exterior face of a panel made of such laminates is superior to one in which a non-porous thermoplastic sheet is used.

The combining of a layer of the heat-sealable polyurethane foam with a layer of thermoplastic material by heat-sealing techniques is accomplished in the usual manman. When laminating two components together by dielectric heat-sealing methods, energy in the form of radio frequency waves or waves of higher frequency is introduced into the components held in intimate association within a die press, the wave-energy being converted to heat as it travels through the two layers to be combined. The configuration of the design to be imparted to the laminate is embodied in the die (or dies) of the press in which the components to be heat-sealed are confined. Commercial heat-sealing apparatus which has been used extensively for dielectric heat-sealing employs radio waves having a frequency in the range of 18 to 30 megacycles. The length of time that the energy is directed through the components to be heat-sealed will vary, of course, depending upon the thickness and area of the layers to be combined, the specific materials to be combined and their densities, and the frequency of wave energy and power output of the heat-sealing apparatus being employed, although a time of from about 1 to 5 seconds normally is sufficient. The die press is maintained in a closed condition after the energy is turned off for a time (commonly referred to as "dwell time") sufficient to allow the combined layers to cool below the softening temperatures of the components which have been combined so that the heat-seal bond is not destroyed upon opening the heat-seal press. A dwell time of 3 to 10 seconds normally is required.

The exceptional superiority in heat-sealability of flexible polyurethane foams containing the class of carbon blacks to which this invention pertains is illustrated by the following illustrations. The polyurethane foams all were made in accordance with the following formulation:

| Material: | Parts by weight |
|---|---|
| Polyether (polyoxypropylene glycerin) | 100.0 |
| Toluene diisocyanate | 38.9 |
| Carbon black (graphite in one instance) | 2.0 |
| Water | 3.0 |
| Stabilizer (silicone surfactant stabilizer—L-520) | 1.5 |
| Stannous octoate | 0.4 |
| Triethylene diamine | 0.06 |

The carbon blacks (and the graphite in one instance) were dispersed in the urethane mix using propeller agitation. One-half inch thick layers of the resulting polyurethane foams were heat-sealed to 0.050 inch thick layers of vinyl foam using a 10 kilowatt, 18 megacycle Thermatron heat-sealer. The press was maintained in a closed condition by 100 p.s.i. air pressure acting upon a 3½ inch cylinder. The die used in the evaluation had a surface area of 1.71 square inches (9 inches x 0.190 inch). The bond strength between the heat-sealed layers were determined on a Scott tester. The observed bond strengths between the layers of the heat-sealed laminates for the various polyurethane foams were:

| Specimen | Carbon Black | Physical Form | Bond Strength lbs./inch |
|---|---|---|---|
| 1 | Vulcan XC-72R (oil furnace black with characteristics of carbon black class to which this invention pertains). | Fluffy | 5.87 |
| 2 | Nuchar C190N (activated black). | do | 1.95 |
| 3 | Carbolac-¼ (channel black) | do | 1.80 |
| 4 | Carbolac-46 (channel black) | do | 2.00 |
| 5 | Supercarbovar (channel black) | do | 3.20 |
| 6 | ELF-4 (channel black) | do | 1.70 |
| 7 | ELF-5 (channel black) | do | 1.90 |
| 8 | ELF-0 (channel black) | do | 1.95 |
| 9 | Mogul-A (channel black) | do | 1.00 |
| 10 | Sterling FT (thermal black) | do | 1.70 |
| 11 | Sterling MT (thermal black) | do | 0.40 |
| 12 | Vulcan 9 (oil furnace black) | Pelletized | 2.20 |
| 13 | Elftex 5 (oil furnace black) | Fluffy | 2.00 |
| 14 | Sterling 10R (oil furnace black). | do | 0.95 |
| 15 | Regal 99R (oil furnace black) | do | 2.30 |
| 16 | Graphite 194 | | 2.85 |
| 17 | Conductex SC (conductive grade black). | Fluffy | 1.85 |

It will be observed that Specimen 1 (which utilized a heat-sealable polyurethane within the purview of this invention) exhibited a bond strength of 5.87 pounds per inch between the heat-sealed layers whereas the bond strength of the next highest specimen (Specimen 5) was only 3.20 pounds per inch, a bond strength of only about 54% of that of Specimen 1. A polyurethane foam control specimen was made in accordance with the formulation employed for making Specimens 1 through 17 except that no carbon black (or graphite) was added to the control specimen. The polyurethane foam control specimen exhibited a bond strength when evaluated as described above of 2.45 pounds per inch.

In addition to those uses for the laminates mentioned hereinabove, such heat-sealed laminates have found extensive use in clothing designed to be light in weight but warm because of the heat-insulation provided by the layer of polyurethane foam. The polyurethane foams of this invention even may be heat-sealed to another layer of such polyurethane foam (usually to a layer of foam that has a density which is different from the first layer) to form laminates which have been found to be extremely useful as soap pads.

What is claimed is:

1. A heat-sealable flexible polyurethane foam having uniformly dispersed therein an oil furnace carbon black having the following characteristics:

Volume resistivity, 10–30 ohm.-cm. (measured in accordance with A.S.T.M. Designation D991–48T; 50 parts of carbon black per hundred parts of rubber in natural rubber compound) as follows:

| Material: | Parts by weight |
|---|---|
| Natural rubber | 100.0 |
| Carbon black | 50.0 |
| Zinc oxide | 5.0 |
| Stearic acid | 3.0 |
| Pine tar | 3.0 |
| Antioxidant | 1.0 |
| Accelerator | 0.5 |
| Sulfur | 2.5 |

Cure: 60 minutes at 280° F.

Average particle diameter _____ 26–35 millimicrons.

Volatile content (measured in accordance with A.S.T.M. Designation D1620–58T) _____ 1.70–2.5%.

Bulk density (unpelletized) _____ 5–7 lbs./cu. ft.

Surface area _____ 170–220 m.²/gm.

Oil absorption _____ 2.4–3.0 cc. of oil/gm. of black.

Iodine number (measured in accordance with A.S.T.M. Designation D1510–57T) _____ 230–270.

2. The heat-sealable flexible polyurethane foam of claim 1 in which said carbon black is present in an amount from 0.5 to 4.5 parts by weight of the said carbon black per 100 parts by weight of the polyol used in making the polyurethane foam.

3. The heat-sealable flexible polyurethane foam of claim 1 in which said carbon black is present in an amount from 0.5 to 3.0 parts by weight of the said carbon black per 100 parts by weight of the polyol used in making the polyurethane foam.

4. The heat-sealable flexible polyurethane foam of claim 1 in which said polyurethane foam is a polyether urethane foam.

5. The heat-sealable flexible polyurethane foam of claim 3 in which said polyurethane foam is a polyether urethane foam.

6. A laminate comprised of a layer of the flexible polyurethane foam of claim 1 combined with a layer of a flexible heat-sealable material by heat-sealing.

7. A laminate comprised of a layer of the flexible polyurethane foam of claim 1 combined with a layer of a flexible thermoplastic material by heat-sealing.

8. The laminate of claim 7 wherein said layer of flexible polyurethane foam is a polyether urethane foam in which the said carbon black dispersed therein is present in an amount from 0.5 to 3.0 parts by weight of the said carbon black per 100 parts by weight of the polyether used in making the said polyurethane foam.

9. The laminate of claim 7 in which said layer of thermoplastic material is a vinyl chloride polymer layer.

10. The laminate of claim 7 in which said layer of flexible polyurethane foam has a density of from 1.2 to 3.0 pounds per cubic foot and a thickness of from ⅛ to 1.0 inch and in which said layer of thermoplastic material is a vinyl chloride polymer foam layer up to ⅛ inch thick.

References Cited

UNITED STATES PATENTS 3,061,460  10/1962  Schickedanz.
3,244,571  4/1966  Weisman.

ROBERT F. BURNETT, Primary Examiner

W. J. VAN BALEN, Assistant Examiner

U.S. Cl. X.R.

156—306; 161—162, 165, 166, 190; 260—2.5